United States Patent [19]

Bond et al.

[11] Patent Number: 5,349,654
[45] Date of Patent: Sep. 20, 1994

[54] FAULT TOLERANT DATA EXCHANGE UNIT

[75] Inventors: David G. Bond; Vincent A. Caluori, both of Kent; Todd Hill, Seattle; David T. Kirkland, Kent; Michael L. Raftery, Federal Way; Derek J. VanAlen, Kent, all of Wash.

[73] Assignee: The Boeing Company, Seattle, Wash.

[21] Appl. No.: 839,208

[22] Filed: Feb. 20, 1992

[51] Int. Cl.$^5$ ............................................. G06F 11/08
[52] U.S. Cl. .................................... 395/575; 371/36; 364/269.1
[58] Field of Search ................. 371/36, 8.1, 9.1; 395/575; 364/269.1, 269.2, 268.3, 268.8

[56] References Cited

U.S. PATENT DOCUMENTS

| | | | |
|---|---|---|---|
| 4,015,246 | 3/1977 | Hopkins, Jr. et al. | 340/172.5 |
| 4,082,922 | 4/1978 | Chu | 179/15 BA |
| 4,101,958 | 7/1978 | Patterson et al. | 364/200 |
| 4,328,580 | 5/1982 | Stockham, Jr. et al. | 371/8 |
| 4,357,702 | 11/1982 | Chase et al. | 371/1 |
| 4,392,199 | 7/1983 | Schmitter et al. | 371/11.1 |
| 4,402,090 | 8/1983 | Gfeller et al. | 455/601 |
| 4,453,215 | 6/1984 | Reid | 364/200 |
| 4,654,857 | 3/1987 | Samson et al. | 371/68 |
| 4,665,522 | 5/1987 | Lala et al. | 371/36 |
| 4,698,019 | 9/1987 | Tulpule et al. | |
| 4,771,427 | 9/1988 | Tulpule et al. | 371/36 |
| 4,774,709 | 9/1988 | Tulpule et al. | 371/11.1 |
| 4,868,826 | 9/1989 | Smith et al. | 371/9.1 |
| 4,907,232 | 3/1990 | Harper et al. | 371/36 |
| 4,967,347 | 10/1990 | Smith et al. | 371/3 |
| 4,979,191 | 12/1990 | Bond et al. | 375/108 |
| 5,233,542 | 8/1993 | Höhner et al. | |

FOREIGN PATENT DOCUMENTS 2093614 9/1982 United Kingdom ......... G06F 11/16

OTHER PUBLICATIONS

Tulpule et al. Achieving Fault Tolerance in Multchannel Control Systems (IEEE 1991) pp. 275–280.

*Primary Examiner*—Robert W. Beausoliel, Jr.
*Assistant Examiner*—Albert Decady
*Attorney, Agent, or Firm*—Christensen, O'Connor, Johnson & Kindness

[57] ABSTRACT

A data exchange system for use in a system that includes a plurality of redundant channels (12). A data exchange unit (30) is provided to process data, ensuring that consistent data are used by each of the channels. The data exchange unit votes the data so that an output is provided that is identical in non-faulty channels. The data exchange units communicate over an inter-channel net that includes a consistency port (160), which serves as a separate second fault containment region for each channel, enabling the data exchange system to be Byzantine resilient. If input data are provided by a single one of the redundant channels, the data are distributed to each of the data exchange units for all channels in the system using two rounds of communication. However, if nominally identical data are input to each of the data exchange units in the redundant channels, a single round of communication and a simple voting process are used to determine a consistent output for each channel. A multiplexer (112) is used to select the data source for distribution to the consistency ports of each of the data exchange units. A 16-bit voter circuit (130) in each data exchange unit votes on the data received by the data exchange unit from the consistency ports for all of the channels to determine the output that is used by each channel.

20 Claims, 10 Drawing Sheets

FAULT TOLERANT DATA EXCHANGE UNIT

FIELD OF THE INVENTION

The present invention generally relates to a fault tolerant computer system, and more specifically, to hardware that conveys data to and/or from a computer, compensating for a fault in at least one channel on systems having redundant channels.

BACKGROUND OF THE INVENTION

A commercial aircraft or spacecraft typically includes many redundant systems to insure the safety of the passengers in the event that a critical component in one of the systems fails. For example, the avionics system on such a craft can include three or more redundant computers and supporting hardware, each computer being connected to process the same data from a common source or redundant data from different sources monitoring the same parameter, in order to produce an output that is consistent in the presence of faults. Should a fault cause an error in any of the data so that different results are produced by one of the redundant computers, the results of the other two computers that agree are used by the avionics system. The step of selecting data for use in a process from among the outputs of redundant sources is called "voting." Although noise or other transient occurrences can produce one-time disagreements between redundant data sources that do not have a long-term adverse impact on a system, continuing disagreements usually indicate a failed component or break in communications on one of the channels, e.g., due to an intermittent connector that causes one bit in the data transmitted to be different on one channel than it is in all other channels. Accordingly, fault tolerant systems can be configured to lock out one of the redundant channels if it continues to produce results that vary from the other channels.

A truly fault tolerant system employs redundancy at multiple levels. For example, in addition to including redundant computers for processing data, a fault tolerant system should have redundant sensors to monitor critical parameters. Redundant clocks are also often provided to insure that the computers operate on a consistent time base, and a fault tolerant method is then required for selecting the clock signal or time base used by the system. In commonly assigned U.S. Pat. No. 4,979,191, a fault tolerant clock system is disclosed that carries out this function in a novel manner. The fault tolerant clock system disclosed therein is "Byzantine resilient," because it uses a method that addresses the classical exercise in logic known as the Byzantine Generals' Problem.

In the Byzantine Generals' Problem, a city is surrounded by the Byzantine Army, separate divisions of which are each controlled by one of N different generals. Communication between the generals is limited to oral messages carried by runners. One or more of the N generals may be a traitor who will attempt to confuse the other generals by sending false messages. For the simple case in which there are only three generals, it has been shown that a single traitor can confuse two loyal generals, leading to the theorem that more than two thirds of N generals must be loyal to guarantee that the loyal generals can properly reach agreement on a plan of battle.

By analogy to this classic problem, a single clock channel in which a fault appears can prevent two other clock channels from being correctly synchronized if the fault causes a different time base signal to be conveyed to each of the properly operating clock channels during an attempted synchronization process. Based on this theorem, it would appear that at least four redundant clock channels are required in a clock system in order to tolerate a single fault. However, in U.S. Pat. No. 4,979,191, the fault tolerant clock system disclosed achieves Byzantine resilience by using only three clock channels, each having two fault containment regions. Thus, with only three channels, a single fault can be tolerated (a plurality of faults in a given fault containment region are considered equivalent to a single fault).

The Byzantine resilience requirement also extends to other aspects of a fault tolerant system, including the exchange of data over redundant channels. The data may comprise sensor input signals or the output signals produced by redundant computers in response to input signals that are nominally the same. A data exchange unit (DEU) should be incorporated into the system for each channel to insure that non-faulty, redundant computing channels receive identical input data and transmit identical output data. A voting function is required in order to accommodate faults in the data interchange, since the data being exchanged on the redundant channels can differ between channels.

Others have attempted to provide solutions to this problem. For example, U.S. Pat. No. 4,101,958 discloses apparatus and a method for transferring redundant control data in an aircraft digital flight control system. To control data exchange among redundant computation channels, the system includes a register into which a "tic" is entered when selected data are written into a main memory. The position of the tic in the register corresponds positionally to the address of the main memory at which the data are being written. The tic-containing register is searched, and when the tic is found, the data are retrieved from the main memory, multiplexed in sets with raw sensor data, and transmitted to the other redundant channels in serial format. However, this approach is not Byzantine resilient, because it can not be proven immune to any single point failure. Also, the voting is done by the central processing unit (CPU), using direct memory access (DMA) to move the data into the CPU, and interleaves sensor data with computed data. This approach increases the computational overhead on the CPU and the likelihood of communication errors.

Ideally, a data exchange unit (DEU) should support multiple levels of data management system redundancy, e.g., from one to four channels, without any hardware changes to the unit. The DEU should also provide a mechanism for inter-channel communications, to insure that the data management system can initialize in the presence of any single fault. None of the prior art data exchange methods or apparatus include these capabilities.

SUMMARY OF THE INVENTION

In accordance with the present invention, a DEU for use in a fault tolerant system having redundant channels is provided. In the fault tolerant system, each channel is associated with a different DEU and the DEUs are used for transferring data from at least one source, so as to detect and compensate a fault in at least one channel of the redundant channels, thereby insuring that each redundant channel transfers the same data. Each DEU comprises a transmitter connected to receive the data from the source over a local bus for a channel with which the DEU is associated, and the transmitter distributes that data to the other DEUs associated with each of the channels over an inter-channel communications link. A multiplexer in each DEU has an output and plural inputs connected to the inter-channel communications link to receive the data distributed by the transmitters of the DEUs for all of the channels. Receiver means in the DEU receive data conveyed over the inter-channel communications link from the output of the multiplexer in each DEU associated with each channel so that a separate data input and data output for the receiver means are provided for each of the channels. Also included are initialization means for initializing the DEU to synchronize it with the DEUs for the other channels of the fault tolerant system. A voter selects the data output of the receiver means for transmission to the recipient, based on predefined logic, so as to insure that at least one fault in the data input to the receiver means is compensated.

Preferably, the initialization means comprise second receiver means that have plural inputs connected to the inter-channel communications link for separately receiving the data distributed by the transmitter in the DEU associated with each channel and separate outputs over which the data are conveyed. The initialization means also comprise a plurality of buffers, each connected to one of the separate outputs of the second receiver means, for providing temporary storage of the data output from the second receiver means until used to initiate the DEU.

The DEU further comprises control means for determining the type of dam to be conveyed through the DEU and for controlling data transfer within the DEU. The control means determine whether the data to be distributed by the transmitter in the DEU for each channel comprise single source data or nominally identical data. In response to a control signal provided to the multiplexer by the control means indicative of single source or identical data, the multiplexer selects an appropriate one of its inputs to provide the data that appear on the multiplexer's output. For single source data, the control means cause the multiplexer to select its input that is connected to receive the data distributed by the transmitter comprising the same DEU as the multiplexer, as a source to provide the data for the multiplexer output.

For each of the channels, a plurality of buffers are connected between outputs of the receiver means and the voter; these buffers store sufficient data to accommodate a desired maximum skew in a rate at which data are transferred. Error logging means connected to the voter are operative to log errors detected in the data input to the voter from the receiver means.

The inter-channel communications link preferably comprises a plurality of consistency ports, each consistency port having an input and a plurality of outputs. The output of the multiplexer in each DEU is connected to the input of a different one of the plurality of consistency ports, and each of the plurality of outputs of each consistency port is connected to a different input of the receiver means in each of the DEUs. Each of the consistency ports comprises a fault containment region that prevents at least a single fault in the distribution of data by the transmitter from being propagated to the receiver means.

A method for transferring data between at least one source, so as to detect and compensate a fault in at least one channel of a fault tolerant system having redundant channels for communicating and processing data is a further aspect of this invention. The method comprises steps that are generally consistent with the functions carried out by the elements of the DEUs defined above.

DETAILED DESCRIPTION OF THE PREFERRED EMBODIMENT

Figure 1:
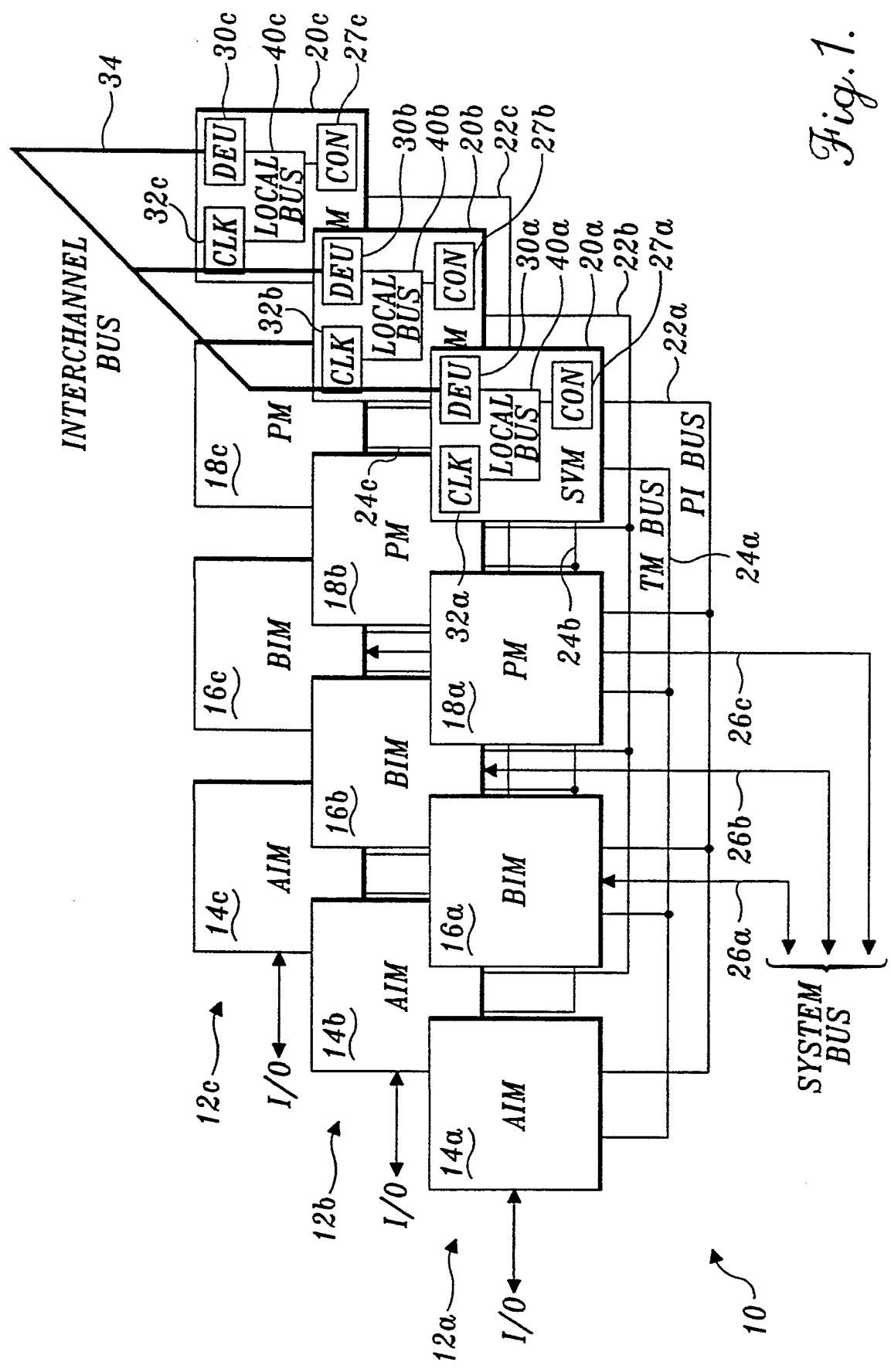
FIG. 1 is a schematic block diagram of a fault tolerant system having three redundant channels, each channel incorporating a DEU in accordance with the present invention.

An integrated fault tolerant avionics system shown generally at reference numeral 10 includes three data exchange units (DEUs) 30a through 30c that are in accord with the present invention. Avionics system 10 comprises three active redundant channels 12a through 12c. A fourth channel (not shown in order to simplify the illustration) serves as a spare and is used in the event that a fault is detected in one of the three active channels. Alternatively, avionics system 10 can be configured with four (or more) active channels to provide increased fault tolerance. Channels 12 process input and output data for the avionics system, e.g., data from sensors and signals transmitted to other components of the avionics system. Each channel includes a processing module (PM) 18a, 18b, or 18c that includes a CPU (not separately shown), an application interface module (AIM) 14a, 14b, or 14c, which serves as an input/output (I/O) interface to various sensors and avionics instruments, none of which are illustrated, and a bus interface module (BIM) 16a16b, or 16c, which interfaces signals conveyed between the AIM and the PM. In addition, BIMs 16 are each connected to a separate system bus comprising one set of data lines 26a, 26b, or 26c. The system bus conveys data and control signals to and from the avionics system with respect to other systems in the aircraft.

Three other buses are provided in avionics system 10, including a processor interface (PI) bus, which includes lines 22a, 22b, and 22c; a test and maintenance (TM) bus for each channel, including lines 24a through 24c; and an inter-channel bus 34 that serves as an inter-channel communications link to interconnect DEUs 30. The inter-channel bus is the only communications link between channels 12a through 12c. The DEUs are disposed on three correspondingly numbered synchronization and voter modules (SVMs) 20a through 20c, each of which also includes a local bus 40a, 40b, or 40c, connecting the respective DEU disposed on the SVM to a corresponding clock module 32a, 32b, or 32c, and a microcomputer 27a, 27b, or 27c. Each SVM is also connected to the separate PI bus and TM bus for its respective channel.

In the preferred embodiment, inter-channel bus 34 includes a fiber-optic link, since complete electrical isolation between each of the redundant channels in the avionics system is required. For other applications without this need, conventional copper conductors may be used. The DEUs serve as the arbiters of cross-channel communication over the inter-channel bus to settle any disagreements between the channels concerning the data that are transferred and used by each channel. DEUs 30 are an important aspect of avionics system 10, since they ensure that the redundant channels continue to operate in the presence of any single non-generic fault, including a Byzantine-type fault, by producing output data that are the same for all of the redundant channels.

As explained below, each channel 12 comprises a fault containment region. Inter-channel bus 34 includes a consistency port for each channel (not separately shown in FIG. 1) that comprises a second fault containment region. Provision of two fault containment regions for each channel enables SVMs 20 to have the following fault tolerant characteristics: (a) any single channel is independently capable of performing its loaded (assigned) task; (b) any two channels comprise a fault tolerant data exchange system capable of error or fault detection; (c) any three channels comprise a fault tolerant data exchange system capable of sustaining correct operation in the presence of any single non-generic fault, including a malicious or Byzantine-type fault (in this context, a fault refers to one or more problems within a single fault containment region that would cause a data error); (d) four channels form a controller such that after any single fault has been isolated to a specific channel, the spare channel can be selected to replace the failed channel so that the controller becomes equivalent to a three-channel fault tolerant data exchange system; and (e) the fault tolerant data exchange system is capable of graceful degradation or timely regeneration as channels fail or become available, respectively.

To achieve these fault tolerant characteristics, SVMs 20 must be initialized to identical known states and placed in a time synchronous mode of operation. These requirements are both non-trivial and important if the redundant channels are to initialize into synchronous operation in the presence of a fault. The process for synchronizing DEUs during initialization is explained below.

Time consistency in DEUs 30 is also important, since non-faulty channels must present data to the voting functions incorporated within the DEU within a known time interval relative to other non-faulty channels. Accordingly, non-faulty channels must obtain and maintain similar perceptions of time and perform like operations (i.e., produce identical results) within known time spans. For this reason, clocks 32 are an important part of the SVMs, and enable the DEUs to carry out their task properly by making available periodic time pulses that are guaranteed to occur within a known limit of skew in non-faulty channels.

Figure 2:
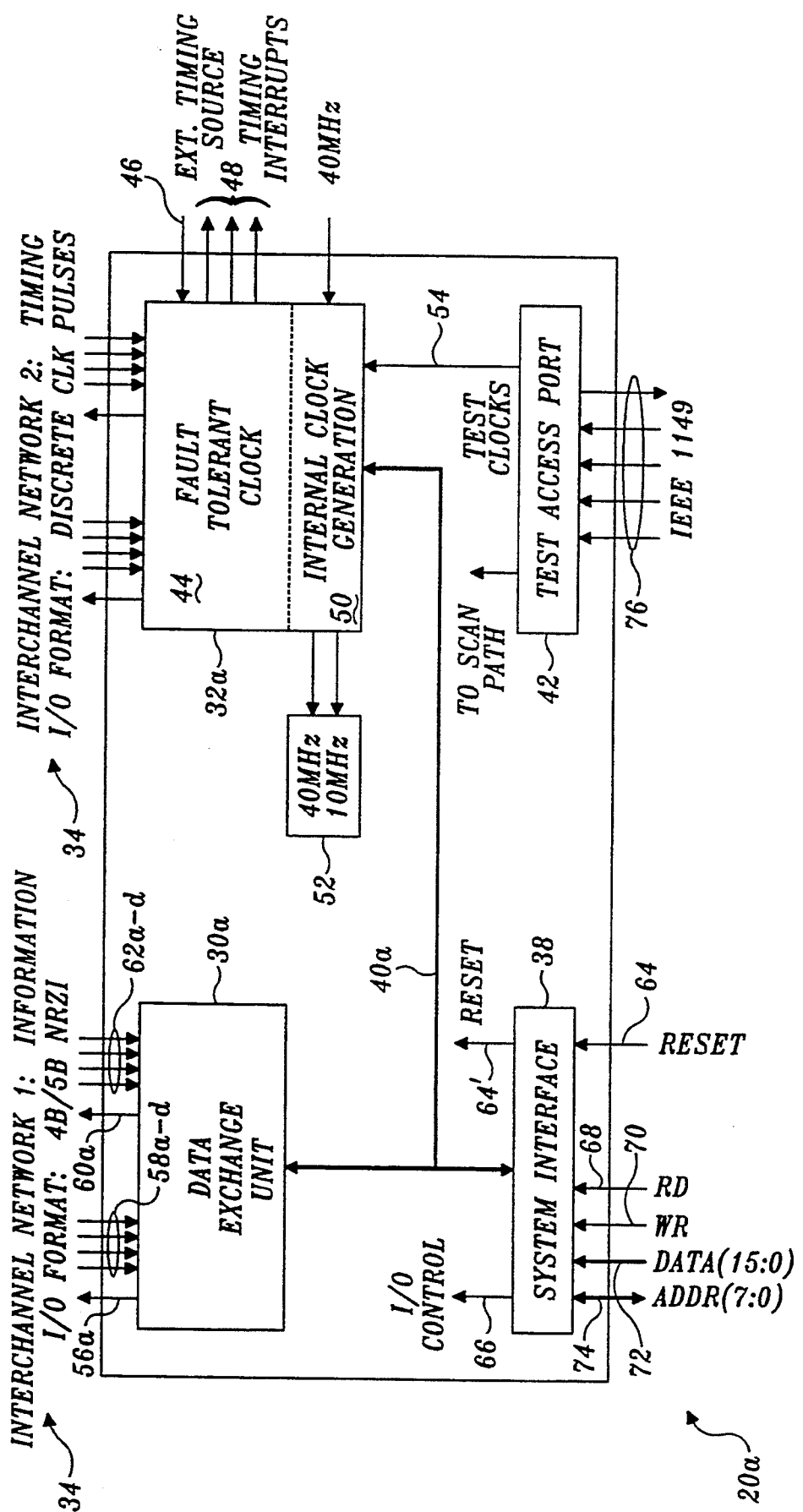
FIG. 2 is a general schematic block diagram of a fault tolerant data exchange circuit for one channel, including a fault tolerant clock and the DEU.

Details of a portions of SVM 20a that is relevant to this invention are shown in FIG. 2. FIG. 2 only shows the portion of the SVM implemented in an application specific integrated circuit (ASPIC), and it should be understood that each SVM 20 also includes a microprocessor, memory, and a PI-bus interface (none of which are shown). Each of the other SVMs 20 used in avionics system 10 are identical to SVM 20a and are therefore not separately shown or discussed. Clock 32a includes a fault tolerant clock section 44 that is supplied with system timing signals over a line 46 and in response, produces a plurality of timing interrupt signals over lines 48. Alternatively, the system timing signals may be locally generated. An internal clock generation circuit 50 uses a 40 MHz crystal controlled timebase for the channel to produce 40 MHz and 10 MHz synchronization signals as indicated in a block 52. Details of the operation of fault tolerant clock section 44 are explained in commonly assigned U.S. Pat. No. 4,979,191.

A test access port 42 includes a plurality of inputs and outputs 76 conforming to the Institute of Electronic and Electrical Engineers (IEEE) Specification P1149.1. Test access port 42 is provided to enable testing of SVM 20a to ensure that it is operating properly, both prior to being put into use and while in service. A line 54 connects test access port 42 to clock 32a to convey signals used for testing fault tolerant clock section 44.

As shown at the top of FIG. 2, inter-channel bus 34 comprises an inter-channel communications link for conveying information or data in a 4 bits/5 bits, non-return-to-zero-inverted (NRZI) format. This format was specifically selected to enable the DEU to be fully compatible with and capable of interchanging data over a fiber optic bus, as is used to obtain the required inter-channel electrical isolation in the preferred embodiment. An inter-channel network 1 comprising a first portion of bus 34 includes output lines 56a and 60a, four input lines 58a through 58d, and four input lines 62a through 62d. (Note that the conventional fiber optic light transmitters and receivers used in bus 34 are not specifically shown, since they are well known to those of ordinary skill in this art.) Similarly, an inter-channel network 2, comprising a second portion of bus 34, is associated with fault tolerant clock section 44, and is provided with a plurality of lines to convey clock signals between channels.

A system interface 38 is connected to receive a system reset signal over a line 64; this signal is passed on to DEU 30a and to clock 32a over a lead 64'. Input and output control signals are conveyed to DEU 30a over leads 66 from system interface 38. In addition, system interface 38 is connected to bi-directional data lines 72. The data processed by the DEUs comprise 16-bit words; address lines 74 carry an 8-bit address for storage of the dam. A read (RD) enable signal is conveyed to system interface 38 over a lead 68 and a write (WR) enable signal is input over a lead 70. Local bus 40a conveys control signals, data, and address information between the system interface and both the DEU and clock.

Description of the DEU

Figure 3:
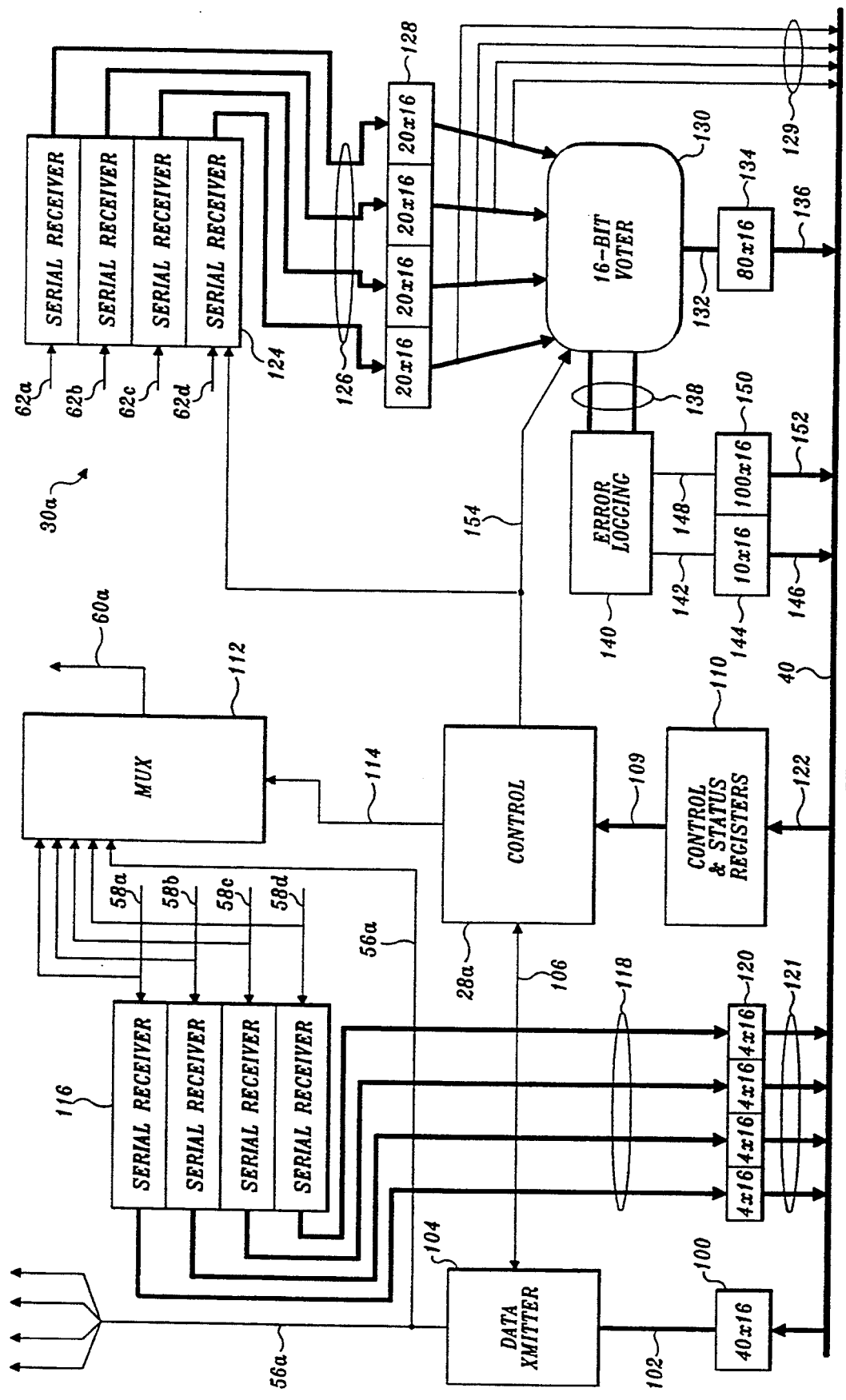
FIG. 3 is a schematic block diagram of one of the DEUs.

Referring to FIG. 3, details of a representative DEU 30a like that comprising the SVM for each channel are shown. Local bus 40 is connected to DEU 30a through an input first-in-first-out (FIFO) buffer 100, having a 40-word (16 bits/word) capacity. A lead 102 connects input FIFO buffer 100 to a data transmitter 104. Data transmitter 104 is controlled in response to control signals provided over a line 106 from controller 28a. The control signals generated by controller 28a are produced in response to an input signal conveyed over a line 109 from control and status registers block 110, which receives its input from PM 18a over local bus 40 through lines 122.

In response to the control signal applied to it, data transmitter 104 transmits a message supplied to it from FIFO input buffer 100 over lines 56a. Lines 56a fan out to each channel of avionics system 10, including channel 12a, the source of the message. A fourth channel, which serves as a spare in this embodiment, is also supplied the message from data transmitter 104 over one of lines 56a. In FIGS. 1 and 2, only the three active channels of avionics system 10 are shown. The fourth channel can also be active, rather than serving as a spare, depending on the fault tolerant requirements of a particular application in which the DEUs are used. Any messages from the other channels are input to DEU 30a over lines 58b through 58d.

The message transmitted from data transmitter 104 loops back into DEU 30a through line 58a to the first of four serial receivers 116. The other lines 58b through 58d are each connected to a different serial receiver 116. The outputs of serial receivers 116 are separately connected to four distribution FIFOs 120, each comprising a 4×16 bit buffer for storing the output of the serial receivers. The outputs from distribution FIFOs 120 are conveyed through lines 121 to local bus 40. Lines 58a through 58d are also connected to different inputs of a multiplexer (MUX) 112, and a fifth input of the MUX is connected to line 56a (directly from data transmitter 104). In response to a signal conveyed from controller 28a through a lead 114, MUX 112 selects one of its inputs for connection to line 60a.

Figure 4:
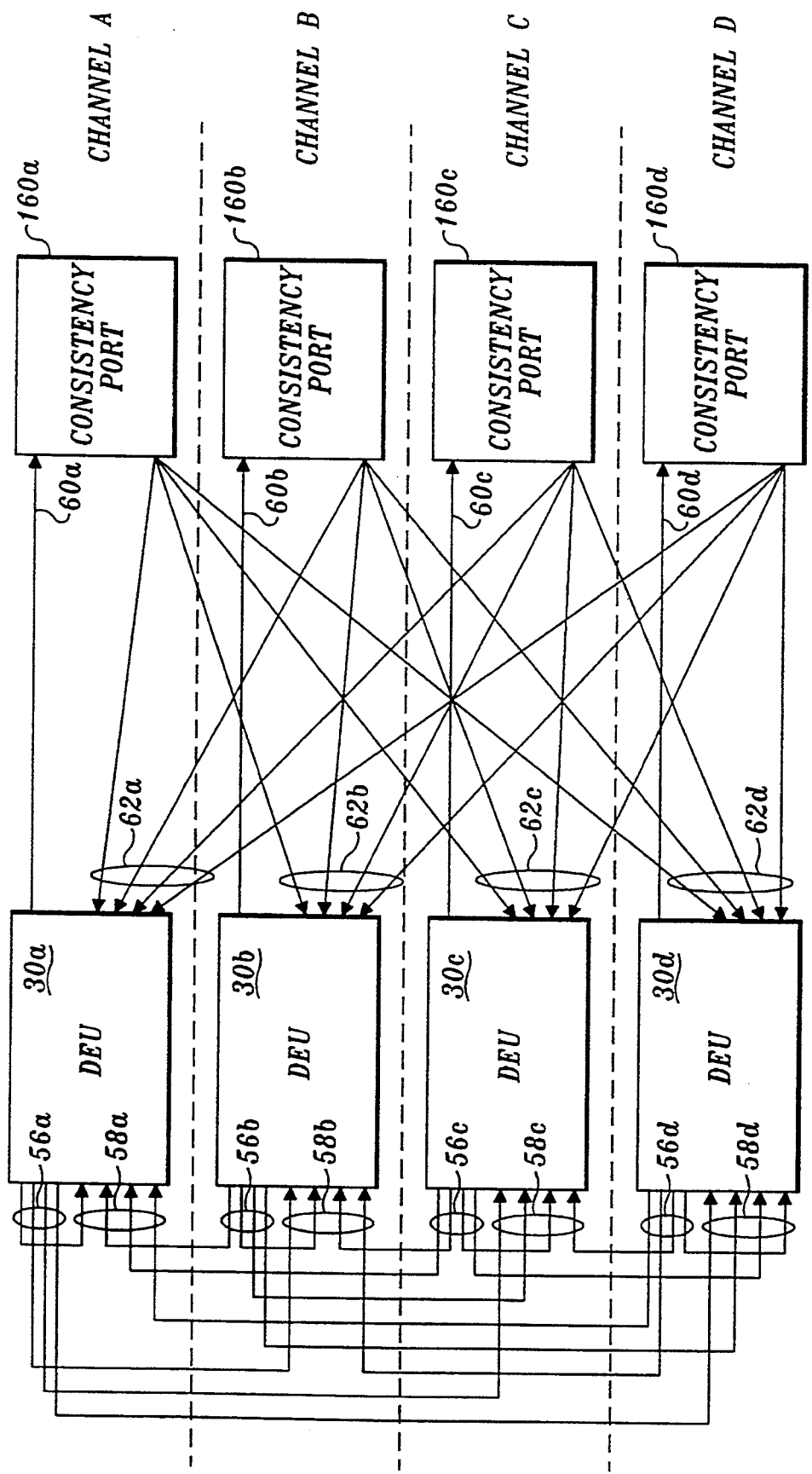
FIG. 4 is a schematic block diagram illustrating the inter-channel data communications bus topology (first and second communication nets) used for transmitting data between four redundant DEUs.

Data selected for output from MUX 112 over line 60a are conveyed out of DEU 30a to a separate fault containment region comprising a consistency port 160 (shown in FIG. 4). The consistency port, which comprises one of the two fault containment regions of the fault tolerant data exchange system for each channel, produces a corresponding output, which is fanned-out and applied back to each of the DEUs, including DEU 30a, over lines 62. Lines 62a through 62d are separately connected to the inputs of serial receivers 124 in each DEU. Data produced by serial receivers 124 in response to these input signals are temporarily stored in synchronization FIFOs 128, which comprise 20×16 bit buffers. The buffered data output from synchronization FIFOs 128 are applied separately to a 16-bit voter circuit 130, which "votes" the applied input data to determine the data or digital signal to be transferred for the channel. The voted output data are conveyed through a lead 132 to an output queue FIFO 134, capable of storing 80×16 bit words. The buffered output data from output queue FIFO 134 are conveyed through lines 136 to local bus 40 and used by channel 12a. Thus, each of the three (or four) active channels in avionics system 10 should have the same data output from their corresponding 16-bit voter on local bus 40, even in the presence of a Byzantine-type fault.

Should a disagreement exist between the four inputs to 16-bit voter circuit 130, an error is logged by an error logging circuit 140, which is connected to 16-bit voter circuit 130 by lines 138. Lines 142 connect error logging circuit 140 to a FIFO buffer 144, which is 10×16 bit words in size (i.e., ten words, each 16 bits in length). FIFO buffer 144 stores one accumulated error status word for data processing operations extending over an entire frame (or synchronization interval, as described below). The error data stored in FIFO buffer 144 are the logical sum of all message error status words accumulated during the previous frame of data.

A FIFO buffer 150 stores 100×16 bit words, each word defining the error status for each of the last 100 messages processed by DEU 30a. The error data buffered by FIFO buffers 144 and 150 are output to local bus 40 over lines 146 and 152, respectively.

In FIG. 4, the relationship of each of the four DEUs 30a through 30d and their corresponding consistency ports 160a through 160d are shown. The interconnection of the DEUs over inter-channel bus 34 is also illustrated. It will be apparent in this illustration that one of the lines 56a from DEU 30a wraps around to return to the same DEU that is its source over line 58a. The remaining three lines 58b through 58d each convey corresponding signals from the other DEUs 30b through 30d to DEU 30a. Each DEU 30 includes an output line 60, which is input to its corresponding consistency port 160. The consistency port for each channel produces a fanned-out output that is connected to each of the DEUs 30 over lines 62.

Description of the Consistency Ports

Figure 9:
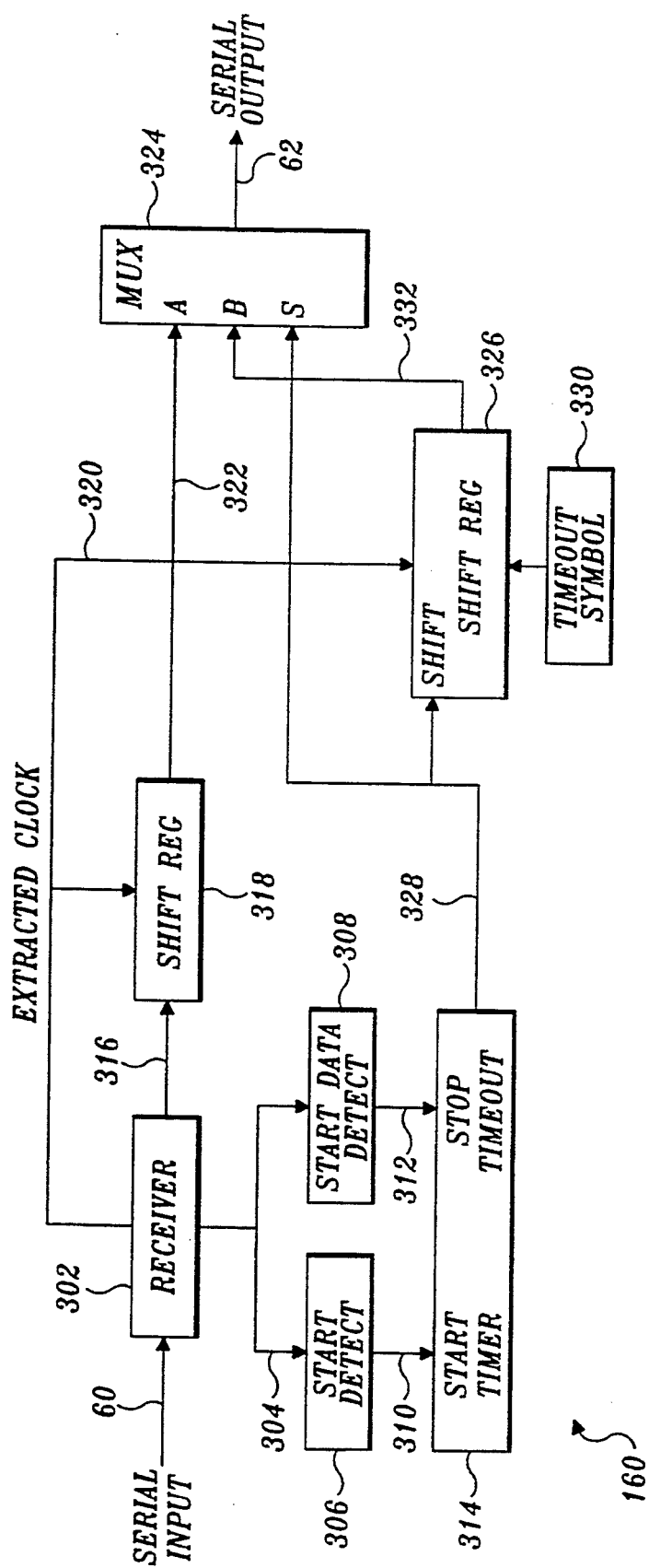
FIG. 9 is a schematic block diagram of a consistency port for one channel of the fault tolerant system.

Referring now to FIG. 9, details of one of the consistency ports are shown. Serial data comprising a message from MUX 112 (in FIG. 3) are applied through line 60 to a receiver 302. Receiver 302 produces a corresponding output on lines 304, split between a start (of message) detect circuit 306 and a start of data detect circuit 308. Start detect circuit 306 produces a signal indicating when a message is first applied to the input of receiver 302, and this signal is conveyed through a line 310 to a timer 314 in order to trigger the timer circuit to begin counting clock cycles. Similarly, start data detect circuit 308 detects the point in the message stream wherein data are transmitted and produces a corresponding start data detect signal that is conveyed through a line 312 to a stop input of timer 314 to stop the count in the timer. Timer 314 is designed to produce a time-out signal at a predefined time interval (or count) after the start signal is received over line 310 unless a stop signal has first been received at the stop port of timer 314. The time-out interval to which timer 314 is set is consistent with the maximum skew between the three (or four) channels after DEUs 30 have been synchronized. Timer 314 thus allows the consistency port to carry out one of its two primary functions, namely, to detect an excessive delay between the start of a message from SVMs 20 and the actual transmission of data in that message.

The detection of an excessive delay between the start of a message and the start of data is really only important when the source of the message is a different channel than that associated with the consistency port processing the message. A line 316 conveys the message output from receiver 302 to a shift register 318. An extracted clock signal derived from the message stream is input on a line 320 to shift register 318, and causes the data to be shifted out of the shift register on a first-in-first-out basis, over a line 322, which connects to one input port of a MUX 324. This input port of MUX 324 is the default input normally selected to provide an output signal from the MUX on line 62. However, if a time-out signal produced by timer 314 is conveyed on a line 328 to the "shift" input of a shift register 326, the shift register is enabled to output a time-out symbol produced by a circuit 330, upon receipt of the next clock signal, which is then output from MUX 324 instead of its normal default input.

Shift register 326 receives an extracted clock signal produced by receiver 302. The presence of the time-out signal at its shift input causes shift register 326 to shift the time-out symbol stored therein to its output port, which is connected through a line 332 to a second input of MUX 324. The time-out signal is also connected to the select port of MUX 324, and causes the MUX to connect its second input, i.e., the time-out symbol applied by shift register 326, to its output on line 62. Accordingly, failure to detect the start of data before the time-out signal is generated results in the time-out symbol being output from the consistency port. Otherwise, the message provided over line 60 is output over line 62.

Figure 10B:
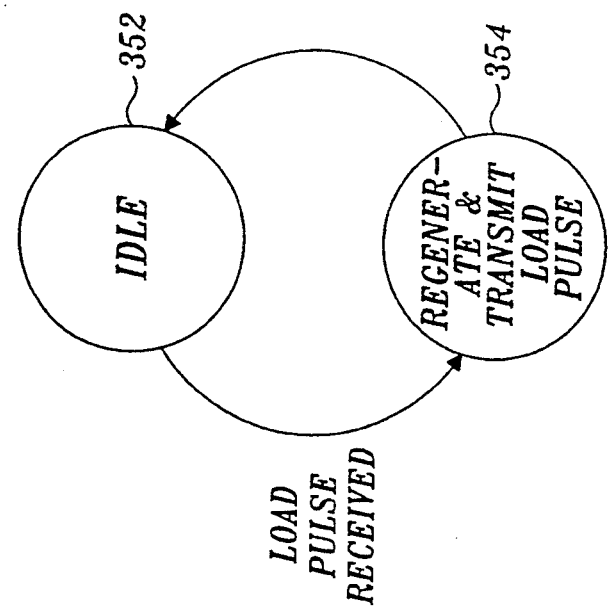
FIGS. 10A and 10B are state diagrams for the data and clock portions, respectively, of the consistency port of FIG. 9.
Figure 10A:
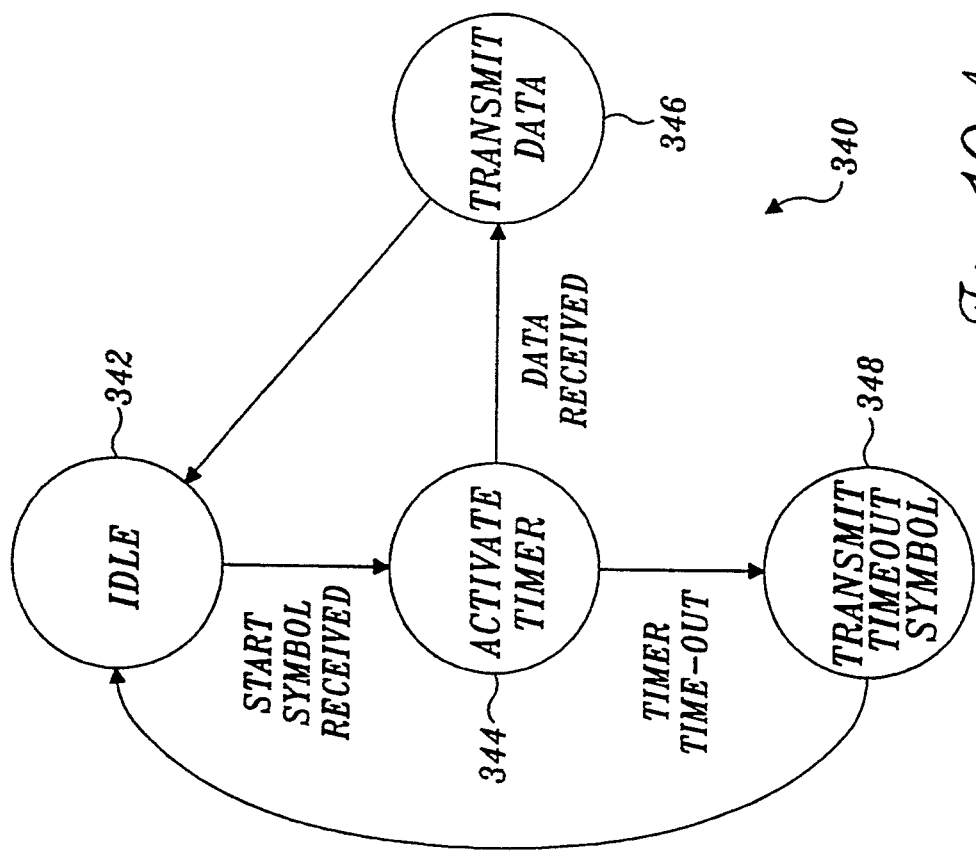

FIG. 10A shows a state diagram for the consistency port. The consistency port remains in an idle state 342 until a start symbol is received, thereby activating the timer as shown in a circle 344. If data are received before the time-out of timer 314, the data are transmitted as indicated by a circle 346. However, if the timer times out before the receipt of data, the time-out symbol is transmitted before the consistency port again returns to its idle state 342, as shown in a circle 348.

FIG. 10B shows the two states for the clock side of the consistency port. The clock remains in an idle state 352 until a load pulse is received as part of the message. The clock then regenerates and transmits the load pulse as shown in a circle 354, before returning to idle state 352.

Figure 8:
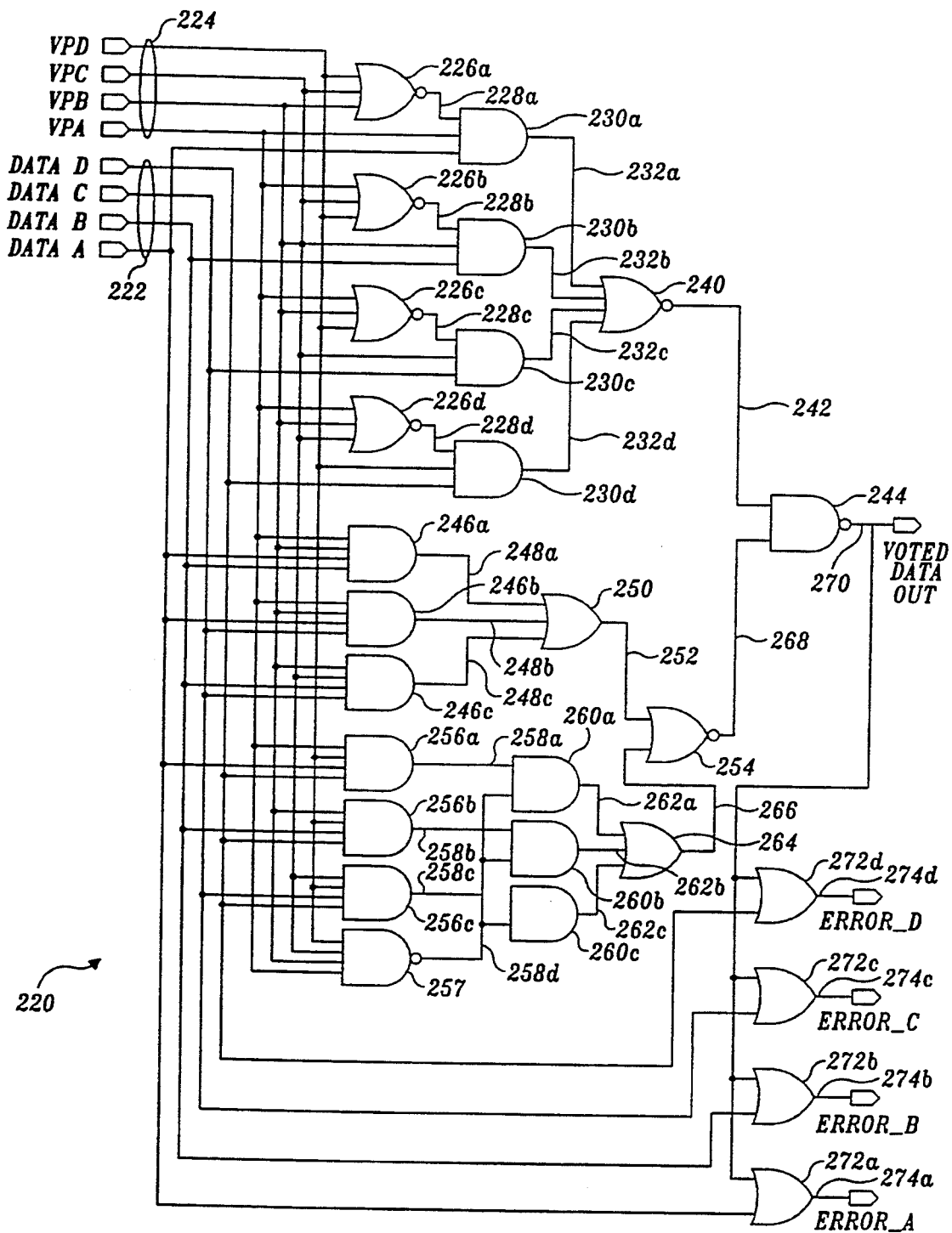
FIG. 8 is a schematic diagram of a voter circuit for one bit of data, which is exemplary of the voter circuits for all of the bits of data, as used in each DEU of a redundant channel system.

In the preferred embodiment, messages comprising 16-bit words are processed by the DEUs. Accordingly, each voter circuit 220 comprises 16 single-bit voter circuits as shown in FIG. 8. Data on channels A through D (assuming four channels are included in the fault tolerant system) are applied on lines 222 to the input of voter circuit 220. Corresponding channel enable signals are applied over lines 224 (a channel enable signal preferably uses a binary 1 to represent an active channel). The channel enable signals are applied three channels at a time to three input NOR gates 226a through 226d, so that if any one of the channels connected to the NOR gate is active, the output of the NOR gate becomes a logic level zero. The output of each NOR gate 226 is conveyed through corresponding leads 228a through 228d to one of three inputs of AND gates 230a through 230d, a second input being provided from the fourth channel that is not connected to corresponding NOR gates 226a through 226d. The third input to each of AND gates 230a through 230d comprises the data lines 222, corresponding to the channel enable lines connected to the second inputs. Thus, for example, the output of AND gate 230a, which has inputs connected to both the channel enable line for channel A and the data line for channel A, would be a logic level 1 if and only if channels B, C, and D are inactive.

Similarly, the output signal from AND gate 230b is a logic level 1 if and only if the data on data line 222 for channel B is a logic level 1 and channel B is the only active channel. The outputs of AND gates 230a through 230d are conveyed through lines 232a through 232d, respectively, to a four input NOR gate 240, which produces a logic level zero output only if one of its inputs from AND gates 230a through 230d is at a logic level 1. Otherwise, the output of NOR gate 240 is a logic level 1 (indicating four active channels); this output signal is conveyed over a line 242 to one input of a NAND gate 244.

The inputs of three AND gates 246a through 246c are each connected to two of the enable signals on lines 224 and to corresponding data lines 222. For example, the inputs to AND gate 246a are connected to the channel enable lines for channels A and B and to the data lines for channels A and B. Similarly, the inputs to AND gate 246b are connected to corresponding channel enable and data lines for channels A and C, while the inputs to AND gate 246c are connected to the corresponding channel enable and data lines for channels B and C. Each of these AND gates 246a through 246c produces a logic level 1 output only if the data on the corresponding channels applied to the inputs of the AND gates are at a logic level 1 and if the channels in which those data appear are to be included in the vote, i.e., active. Lines 248a through 248c convey the corresponding outputs from AND gates 246a through 246c to the inputs of an OR gate 250. A logic level 1 on any one of these input lines produces a logic level 1 output from OR gate 250, which is conveyed on a line 252 to one input of a NOR gate 254.

In addition, the inputs of three AND gates 256a through 256c are connected to receive the channel enable signal and data for two different pairs of channels (different compared to AND gates 246a through 246c). Thus, the inputs to AND gate 256a are connected to the channel enable and data lines for channels A and D; the inputs to AND gate 256b are connected to the corresponding lines for channels B and D; and the inputs to AND gate 256c are connected to the corresponding lines for channels C and D. A NAND gate 257 is connected to each of the channel enable lines, producing a zero output if all channels are enabled to be voted (active).

Lines 258a through 258c connect the outputs of AND gates 256a through 256c to one of two inputs of AND gates 260a to 260c. The other input to AND gates 260 is a line 256d, which carries the output signal from NAND gate 257. The output signal from AND gates 260a through 260c is a logic level 1 if and only if all of the channels are enabled in the vote and the dam on each of the pairs of channels connected to AND gates 256a through 256c are all at a logic level 1. The inputs of an OR gate 264 receives the outputs from AND gates 260a through 260c, producing an output that is conveyed over a line 266 to a second input of NOR gate 254. If either input to NOR gate 254 is at a logic level 1, its output becomes a logic level zero; this output is connected to a second input of NAND gate 244.

With all four channels active and all inputs and all dam lines 222 at a logic level 1 for all four channels, the output of NAND gate 244 should be a logic level 1. Voter circuit 220 produces an output on a line 270 from NAND gate 244 equal to the voted output. Line 270 is also connected to one input of each of exclusive-OR gates 272a through 272d. A second input of each of these exclusive-OR gates is connected to a different one of data lines 222 for each of the four channels A through D. Accordingly, each of the exclusive-OR gates 272a through 272d produces a logic level 1 output for any channel having a different logic level on its input than appears on the voted data output of voter circuit 220. Lines 274a through 274d carry this error signal to error logging circuit 140 (shown in FIG. 3). It will thus be apparent that voter circuit 220 produces a voted output corresponding to the logic level that appears on at least two out of three channels if only three channels are active in the vote, or at least three channels out of four, if four channels are active in the vote. In an extreme case, the voted output may comprise the data from a single channel, if all other channels are excluded from the vote. Voter circuit 220 is replicated 16 times in each channel, producing a voted output for each of the 16 bits comprising a data word.

Operation of the Fault Tolerant DEUs

DEUs 30 process input data in two different modes. The first mode occurs when independent copies of the same data are input to each of the redundant channels and the copies of the data for each channel are expected to be bit-for-bit identical under non-fault conditions; in this mode, the data output from the DEU for each channel can be determined by a simple vote procedure. Alternatively, if the input data are expected to differ slightly from channel to channel, for example, as might occur due to differences in the analog-to-digital conversion of sensor data on each channel, then the DEUs must use an exchange process to determine their respective outputs.

Figure 6:
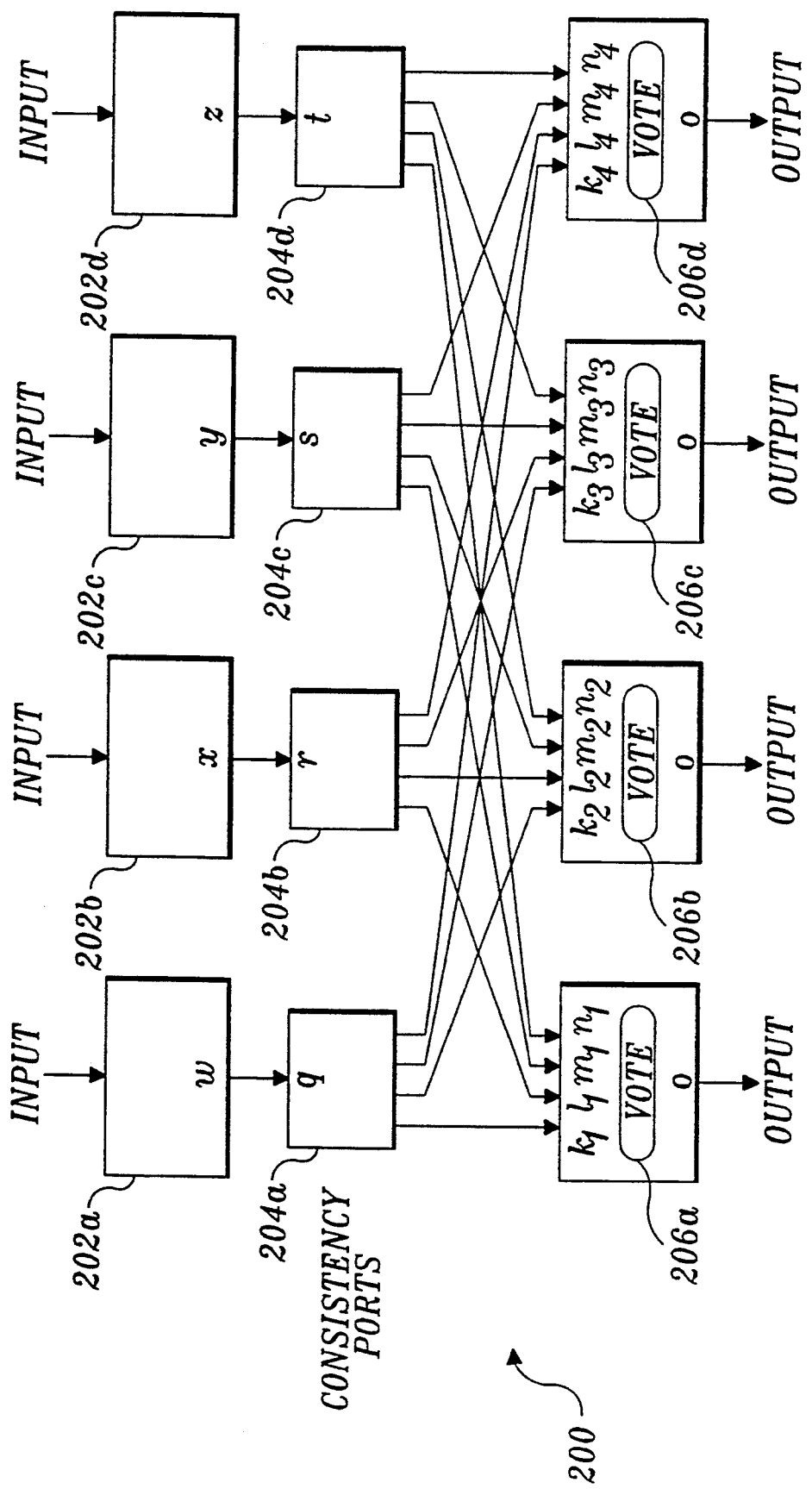
FIG. 6 is a schematic block diagram showing how data flow in a simple vote process used when four channels of redundant data are input.

FIG. 6 illustrates the simple vote used to process data that are supposed to be identical for each channel. Normally, in this case, the same data are applied to the inputs of four SVMs 202a through 202d. SVM 202a produces an output "w" which is applied to a corresponding consistency port 204a as an input "q." Similarly, SVM 202b produces an output labeled "x", which appears as an input "r" on consistency port 204b. The outputs of SVMs 202c and 202d, labeled "y" and "z," appear on the inputs of consistency ports 204c and 204d as "s" and "t", respectively. Consistency ports 204 each fan out the data applied to their corresponding inputs, creating four signals voted by each of voters 206a through 206d. For example, the inputs of voter 206a, labeled $k_1$, $l_1$, $m_1$, and $n_1$, are separately connected to the outputs of each of the consistency ports. Following a similar convention, the inputs to voter 206b on the second channel are labeled $k_2$, $l_2$, $m_2$, and $n_2$, and so forth for each of the other channels. Voters 206 vote their respective four inputs, producing a corresponding common output labeled "o".

It should be apparent that under any condition where no fault exists, the signals w, x, y, z, q, r, s, t, $k_j$, $l_j$, $m_j$, and $n_j$ (for j=1 to 4) are all equal to each other and equal to the output signal o, so that each channel has the same output. Errors or faults in one of the two fault containment regions for any one channel do not affect the capability of all SVMs to produce the same output equal to o. In fact, a fault can exist in two different fault containment regions with four active channels without affecting the ability of the DEUs to produce a common, i.e., identical, output for each channel.

Figure 7:
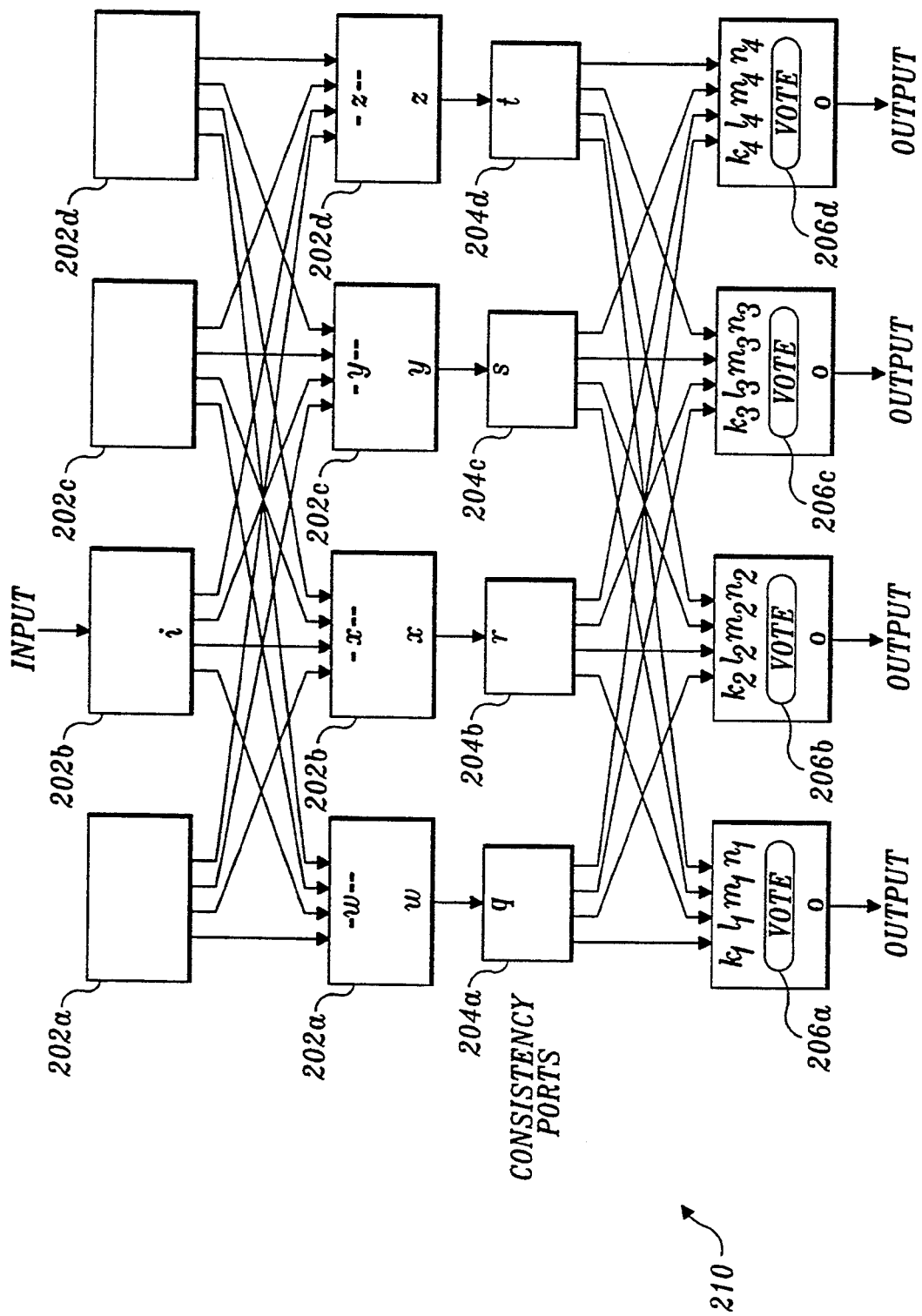
FIG. 7 is a schematic block diagram showing how data flow in an exchange process used when a single channel of data is applied as an input to four redundant channels.

FIG. 7 illustrates the mode where a single source input is connected to one of the channels, for example, to the input of SVM 202b, requiting an exchange process to be implemented before the data corresponding to the input are voted by each channel. In essence, two separate rounds of communication are required to process the input data. In a first round of communication, the output of SVM 202b, indicated by "i, " is fanned-out to each of the SVMs, appearing as a value "w" on synchronization voter module 202a, and as values "x," "y," and "z" at the inputs of SVMs 202b, 202c, and 202d, respectively. In a second round of communication, the outputs of SVMs 202a through 202d, labeled "w," "x," "y," and "z," appear at the input of the consistency ports as "q," "r," "s," and "t." Each consistency port replicates its input signal, producing four corresponding fanned-out output signals that are applied to voters 206a through 206d in each of the SVMs. As in the preceding example for the simple vote process, the inputs for each of the SVMs are labeled $k_j$, $l_j$, $m_j$, and $n_j$, for j=1 through 4. Under no-fault conditions:

$$w=x=y=z=q=r=s=t=k_j=l_j=m_j 32\ n_j=o$$

For the four active channels shown in FIG. 7, up to two separate faults (in different fault containment regions) can be sustained without adversely impacting the ability of the SVMs to produce a consistent output for all four channels.

Initialization and Synchronization

Before each of the DEUs in the system can operate properly, they must be initialized. During the initialization process, the channels have not yet been synchronized, so an inter-channel communication logic algorithm is implemented to allow the channels to initialize. The initialization process makes use of serial receivers 116 and FIFO buffers 120 (shown in FIG. 3). Before synchronization takes place, power-up, chip, module, and channel self tests are completed. Since these self tests are outside the scope of this disclosure, they are not further discussed.

The synchronization process that occurs during initialization synchronizes the hardware components and software in each channel 12 with all the other channels and is performed by the SVM microprocessor (not shown) or by the PM (for example, if the SVM microprocessor is not provided). Synchronization of the system depends upon several basic assumptions, as follows:

(a) The channels are not initially synchronized;
(b) One to four channels complete all self tests;
(c) At most, one channel is faulty;
(d) The time between initiation of synchronization of the first correctly operating channel and the last correctly operating channel is finite within a predefined limit of time; and
(e) It is unknown, a priori, which channels are available and which are operating properly.

If more than one of the channels is faulty, synchronization cannot be guaranteed. Furthermore, assumption (d) is the key to the success of the initialization process, since if this assumption is violated, the synchronization will fail. The ability to synchronize three out of four channels ensures that one of the channels can be removed from operation, allowing the system to operate properly with the three remaining channels.

In carrying out the synchronization, the channels that are to be enabled for voting are defined within a DEU set-up register. In addition, the clock for the DEUs are synchronized and the synchronization is verified. It is difficult to determine the available channels that are to be included in a voting set, because the system has not yet been synchronized. However, information necessary to establish synchronization can be repeatedly transmitted between the channels until synchronization is achieved.

To determine the set of voting channels during the synchronization process, a timer function is initialized in software; a channel initialization status vector is defined and transmitted to each of the redundant channels over lines 56; and, the channel initialization status vectors from the redundant channels are received by each channel and used to build a node initialization status vector, which is then transmitted to each of the redundant channels over lines 60. The redundant channels receive the node initialization status vector and vote it in software, forming a voted node status, which is used to define the voting set. Thereafter, all output FIFOs on each of the DEUs are cleared.

The channel initialization status vector includes a message identification indicating to the receiving channel the nature of the message (i.e., that it is an initialization message), a health status flag, and a timer status flag or value. Using the channel initialization status vectors received by each redundant channel in the system, a node initialization status vector is built that includes a message identification component identifying it and the most recent channel initialization status vectors received from each of the other channels. This process is repeated in a loop until synchronization is established. Termination of the loop occurs when a consensus between the channels is reached regarding the time-out status of each channel. (Once an operative channel has timed out, any channels that are not present must be faulty.) Accordingly, a consensus as to the time-out status of each channel is used to decide whether the initialization loop should be terminated. However, a majority (e.g., three out of four channels) is not required to define a consensus. To determine the consensus of the time-out status of channel A, for example, a consensus function is applied to the channel A time-out status delivered by channels A, B, C, and D in the node initialization status vectors. The time-out status can have three possible values including, T, indicating that a time-out has occurred; F, indicating that a time-out has not occurred; and N, indicating that the status is not yet available. In determining the consensus function, a count is made of the number of arguments in the T, F, and N states for each of the four channels. Table 1 shows the consensus Output for the various conditions of the count of the time-out status.

TABLE 1

| CONSENSUS FUNCTION | | | |
|---|---|---|---|
| Count_T | Count_F | Count_N | Output |
| 0 | 0 | 4 | N |
| 0 | 1 | 3 | N |
| 1 | 0 | 3 | N |
| 0 | 2 | 2 | N |
| 1 | 1 | 2 | N |
| 2 | 0 | 2 | T |
| 0 | 3 | 1 | F |
| 1 | 2 | 1 | F |
| 2 | 1 | 1 | T |
| 3 | 0 | 1 | T |
| 0 | 4 | 0 | F |
| 1 | 3 | 0 | F |
| 2 | 2 | 0 | F |
| 3 | 1 | 0 | T |
| 4 | 0 | 0 | T |

If the Output of the consensus function is equal to T in Table 1, then the loop is terminated; otherwise, the loop continues. Once the loop is terminated, the set of channels to be used in voting is determined. If four channels have delivered a node initialization status vector, then the operative status of each channel is determined by a four-way vote, using a simple majority. In the case of a two-to-two split between the channels, the channel in which the voting occurs is assumed to be inoperative. If three channels have delivered a node initialization status vector, a three-way vote is performed using a simple majority to determine the operative status of the channels under consideration. Further, if only two channels have delivered node initialization status vectors, a comparison is performed, and in the case of a disagreement, the status of the fault tolerant system is assumed to be unhealthy. However, if only two channels have delivered a vector, it is likely that the other two channels have failed, so that synchronization cannot be guaranteed. Finally, if only a single channel has delivered a node initialization status vector, it is apparent that initialization has failed. Following the vote of those channels that have delivered node initialization status vectors, a voting set is thus determined to include each channel that was found operative. Software voting is thus implemented in controllers 28 until the synchronization process is complete; thereafter, voter circuits 130 are used for hardware voting of data, as already explained.

The final step in the synchronization process uses a synchronization interval counter that is included within the fault tolerant clocks (but not separately shown). This counter determines the length of a synchronization interval. At the end of the synchronization interval, a sync pulse is distributed between the channels in a Byzantine resilient manner to obtain a consensus interval termination. Once consensus is achieved on the termination of the interval, a sync interval interrupt is generated and the local synchronization interval counters for each DEU are reloaded with the interval lengths.

At this point, the fault tolerant clocks for each of the channels are not very well synchronized; however, they will be less than one sync interval out of synchronization. Each channel initially transmits its own sync interval pulse, and the sync interval pulses from each of the channels are voted. Upon arrival of the second voted sync interval pulse, an interrupt is generated. The DEUs then load the sync interval lengths corresponding to the voted sync interval into the sync interval counter and the counter is restarted. Since each channel voting should have achieved a common sync interval, this process ensures that a synchronization pulse is generated by each channel within a very small skew (for all other channels that are voting). Typically, in the preferred embodiment, a 10-millisecond sync interval is produced with respect to a clock signal having 100 parts per million accuracy, translating to a maximum skew prior to synchronization of: one microsecond, plus propagation delay differences, plus one clock period. After synchronization, the skew between channels will be equal to the propagation delay differences between the channels, plus one clock period. For example, if the propagation delay differences are equal to 125 nanoseconds, then a maximum skew before synchronization of 1.225 microseconds and a maximum skew of 0.225 microseconds after synchronization results.

Once SVMs 20 are synchronized with each other, they can begin their primary function of accepting blocks of data words, sharing the data between redundant channels using the inter-channel bus, and producing voted data that are guaranteed to be identical in non-faulty channels. Data exchange or transfer through the DEUs is initiated whenever a message block is written to the DEU input FIFO buffer 100 (see FIG. 3).

Figure 5:
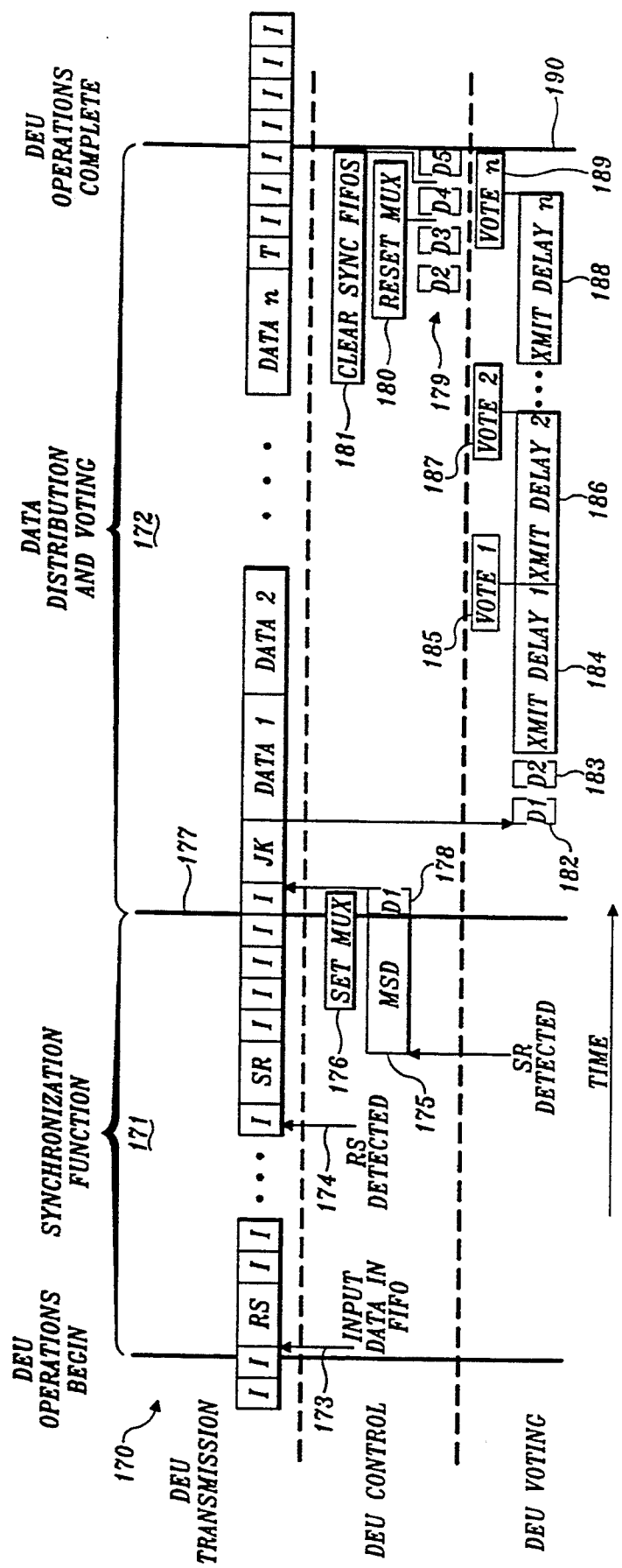
FIG. 5 schematically represents a DEU message stream.

FIG. 5 illustrates a timeline 170 for DEU transmissions used in the synchronization process. As shown by timeline 170, a synchronization function 171 is implemented first, followed by a data distribution and voting function 172. The synchronization function synchronizes the DEUs on channels 12 to within 2 clock cycles of relative skew across channels. In implementing the synchronization function, data symbols are used instead of the clock pulse edges that are used to synchronize the fault tolerant clocks. The synchronization function is triggered at a time 173 by the writing of data to input first-in-first-out (FIFO) buffer 100 in the DEU of each channel. Two rounds of communication, with a vote at the end of each round, are required to synchronize DEUs 30. During the first round of communication, an "RS" symbol is sent out on lines 56 to all channels 12. When a majority of the active channels have transmitted the RS symbols at a time 174 (determined by those channels receiving the symbol voting the message), the second round of communication is initiated. During the second round, an "SR" symbol is transmitted by each active channel. When a majority of the active channels have transmitted the SR symbols, (again determined by the channels receiving the symbol voting the message) at a time 175, all non-faulty channels 12 begin a maximum skew delay (MSD) at nearly the same time. The MSD is equal to the maximum skew that exist across channels 12 between DEU accesses and is imposed to allow any slow channel to "catch up." The end of the MSD, which occurs at a time 177, terminates the synchronization function and marks the beginning of data distribution and voting function 172.

Data distribution and voting function 172 comprises five time delays (a first delay 178 and delays two through five at reference numeral 179), a start symbol (JK), a data stream (DATA 1 through DATA N), and a termination symbol (T). The start symbol warns receiving channels of incoming data, and the termination symbol signifies the end of the data transmission. Each of the five delays 178 and 179 is equal to the maximum possible skew across non-faulty DEUs (two clock cycles—the duration of MSD after the synchronization function is performed). Multiplexer 112 in each DEU is set at block 176 to propagate the data from a channel that is selected as a single source channel. The first delay 178 is then implemented to ensure that any non-faulty channel has at least two clock cycles to set its multiplexer 112 before the single source channel's transmitted data stream arrives. Following the first delay, the start symbol, data stream, and termination symbol are transmitted by the signal source channel.

Before resetting the multiplexer at a block 180, the second and third delays are implemented. The second delay ensures that a fast channel leaves its multiplexer 112 set long enough for a slow channel to send all of its data, and the third delay ensures that the fastest non-faulty channel recognizes all data sent by a faulty channel that is skewed such that it is within the (time) bounds of a slow, non-faulty channel, but outside the bounds of the fast, non-faulty channel. Implementing the third delay guarantees that data received by non-faulty channels are identical. After the third delay, the multiplexer in each channel is reset at block 180, and fourth delay 179 is implemented to ensure that all multiplexers 112 are reset. After the fourth delay, synchronization FIFOs 128 are cleared, and due to the fourth delay, all will remain empty. The fifth delay at reference numeral 179 is implemented to ensure that the slowest non-faulty channel finishes its operations before the fastest channel begins operating on a new DEU message.

Voting by DEUs 30 is triggered by the transmission of data from the single source channel, beginning with a first delay 182 followed by a second delay 183, each of which is equal in duration to the maximum channel skew (two clock cycles, after performing synchronization function 171). First delay 172 ensures that a fast channel 12 does not vote until a slow channel has sourced its data, and second delay 183 guarantees that a fast, non-faulty channel does not vote until a faulty channel (faulty because it is skewed outside the bounds of the fast channel, but within the bounds of the slow channel) sources its data. After the first and second delays, 16-bit voter circuits 130 perform consecutive votes of each data word in the data stream. Each vote comprises a transmit delay (XMIT Delay 1, XMIT Delay 2, through XMIT Delay N), identified respectively, by reference numerals 184, 185, and 188, each of which is twenty clock cycles in duration. These transmit delays are provided to compensate for the transmission time of each word. After each transmit delay, a single clock cycle is required for the actual vote of the data, which occurs at blocks 185, 187, and 189.

For a single source of data, the active channel for that source uses its data transmitter 104 to transmit the data to each of the active channels over lines 56, and the data are applied to one of the inputs of MUXs 112 in each channel. Controllers 28 in each DEU 30 cause their respective MUX 112 to select the incoming line 58 from the single source channel as its active input to provide the message that is distributed over line 60. The message input from the active channel to the selected input of MUX 112 in each DEU is thus transmitted over line 60 to the consistency port 160 of that DEU, and retransmitted from the consistency ports to each of the DEUs over lines 62. Serial receivers 124 in each of the DEUs receive a data message from all of the consistency ports, producing an output that is stored in FIFO buffer 128 and voted upon by 16-bit voter circuit 130. The voted output for each DEU 30 should thus be the same for each word of a message on all active channels, even if a Byzantine-type fault exists in the system.

In the case where nominally identical data are supplied to each of the channels over local bus 40, a simple vote is sufficient so that only one round of data exchange between the DEUs is required before the data are voted. Accordingly, controller 28 causes the input of MUX 112 that is connected directly to the message stream transmitted by data transmitter 104 in the DEU to be selected by the MUX. The output of the MUX is connected by line 60 to the corresponding consistency port 160 of the DEU. In this case, the message stream from data transmitter 104 is not transmitted over lines 56 to each of the other DEUs, thereby eliminating one round of inter-channel communication.

If a previous message has nominally identical data input to each channel, data transmitters 104 begin transmission of the new message header as soon as the previous message is completed. However, if the new message is single source, controller 28 causes MUX 112 to observe the delay/set MUX/delay procedure described above between the transmission of the header and the data.

An exemplary consistency port 160 for one channel is shown in FIG. 9. In this consistency port, timer 314 is loaded with a count equal to the maximum inter-channel skew. If this timer times out before a data word arrives at receiver 302, it is assumed that the data word will not arrive, and a time-out symbol is generated by circuit 330 and transmitted to receivers 124 in all of the channels. If a data word from another voter participant arrives before timer 314 times out, start data detect circuit 308 clears the timer and the data are retransmitted through serial output of multiplexer 324 on lines 62 to all of receivers 124. When the timers time out, it is assumed that all non-faulty channels have transmitted the first word of the message, so that the word can be voted.

Controllers 28 (in FIG. 3) of each DEU 30 determine the redundancy level of a message from the content of the first header word in the message. If the message is of the identical data type on all channels, the controllers assume that the rest of the words in the message will be sent immediately following the first word. Controllers 28 determine the number of words in the message by examining a data word count contained in the header. If the message is single source, controllers 28 know that a delay equal to two times the maximum inter-channel skew should be introduced by data transmitter 104 between the header and data to be voted. The controller, therefore, delays for a period equal to two times the maximum inter-channel skew between the header and the first data word to be voted, before causing 16-bit voter circuit 130 to vote the data.

FIFOs 128 serve as synchronizing buffers for the combinational voter logic described above with respect to FIG. 8. FIFOs 128 queue up the words of a message, and when controllers 28 determine that it is time to vote the message, 16-bit voter circuit 130 uses the output of all four FIFOs 128 as its input, voting each of the 16 bits comprising a word in the message at a time. Although less than all of the channels in the system may comprise a voting set, all of the inputs to 16-bit voter circuit 130 are compared to the voted output, as explained above, and errors are logged for all channels using error logging circuit 140.

Error logging circuit 140 determines three types of errors. An orphan error occurs when a channel tries to vote a word, but no other channels try to vote. This type of error occurs when a channel is not synchronized with the other channels and is recognized when timer 314 times out. No-show errors occur when it is time to vote a word, but a word has not yet arrived from one of the channels. Error logging circuit 140 then logs a no-show error for that channel. Finally, dam errors occur when one of the four channels input a word to 16-bit voter circuit 130 that disagrees with the voted output. The current message error is logged in FIFO 144, whereas frame errors (up to 100 words) are logged in FIFO 150.

While the present invention has been disclosed with respect to a preferred embodiment and a specific application, it should be apparent that the DEUs can be applied in many different types of fault tolerant redundant channel applications. The Byzantine resilience of such a fault tolerant data exchange system and the ability of the DEUs to detect and record various types of errors make them ideally suited for use in avionics and aerospace applications.

The embodiments of the invention in which an exclusive property or privilege is claimed are defined as follows:

1. A data exchange unit for use in a fault tolerant system having redundant channels, each channel being associated with a different data exchange unit, the data exchange units being used for transferring data from at least one source to a recipient so as to detect and compensate a fault in at least one channel of the redundant channels, each data exchange unit comprising:

(a) a transmitter connected to receive the data from the source over a local bus for one channel with which the data exchange unit is associated, the transmitter distributing that data to the other data exchange units associated with each of the channels over an inter-channel communications link;

(b) a multiplexer having plural inputs connected to the inter-channel communications link to receive the data distributed by the transmitter of each data exchange unit for the other channels, and an output;

(c) receiver means for receiving data conveyed over the inter-channel communications link from the output of the multiplexer in each data exchange unit associated with each channel so that a separate data input and data output for the receiver means are provided for each of the channels;

(d) initialization means for initializing the data exchange unit to synchronize it with the data exchange units for the other channels of the fault tolerant system; and (e) a voter that selects the data output of the receiver means for transmission to the recipient based on predefined logic, so as to insure that at least one fault in the data input to the receiver means is compensated.

2. The data exchange unit of claim 1, the initialization means comprising:

second receiver means, having plural inputs connected to the inter-channel communications link for separately receiving the data distributed by the transmitter in the data exchange unit associated with each channel, and separate outputs over which the data are conveyed; and a plurality of buffers, each connected to one of the separate outputs of the second receiver means, providing temporary storage of the data output from the second receiver means until used to initiate the data exchange unit.

3. The data exchange unit of claim 2, further comprising control means for determining the type of data to be conveyed through the data exchange unit and for controlling data transfer within the data exchange unit.

4. The data exchange unit of claim 3, wherein the control means determine whether the data distributed by the transmitter in the data exchange unit for each channel nominally comprise single source data or identical data, and in response to a control signal provided to the multiplexer by the control means indicative thereof, the multiplexer selects an appropriate one of its inputs to provide the data that appears on the multiplexer's output.

5. The data exchange unit of claim 4, wherein for single source data, the control means cause the multiplexer to select its input that is connected to receive the data distributed by the transmitter comprising the same data exchange unit as the multiplexer, to provide the data for its output.

6. The data exchange unit of claim 2, further comprising a plurality of buffers connected between outputs of the receiver means and the voter, in which sufficient data are stored to accommodate a maximum skew in a rate at which data are transferred, for each of the channels.

7. The data exchange unit of claim 2, further comprising error logging means, connected to the voter, for logging errors detected in the data input to the voter from the receiver means.

8. The data exchange unit of claim 1, wherein the inter-channel communications link comprises a plurality of consistency ports, each consistency port having an input and a plurality of outputs, the output of the multiplexer in each data exchange unit being connected to the input of a different one of the plurality of consistency ports, each of the plurality of outputs of each consistency port being connected to a different data input of the receiver means in each of the data exchange units, so that each of the consistency ports comprises a fault containment region that prevents at least a single fault in the distribution of data by the transmitter from being propagated to the receiver means.

9. A fault tolerant data exchange system for use in conveying data in a redundant computer system having a plurality of channels, comprising:
  (a) a plurality of data exchange units, each associated with a different channel of the redundant computer system and each including:
    (i) a local data bus connected to the channel with which the data exchange unit is associated;
    (ii) a transmitter, connected to receive data from the local data bus that is distributed to each of the data exchange units;
    (iii) a multiplexer having an output and a plurality of inputs, each input connected to receive the data distributed from a different transmitter of the data exchange units for propagation through the output when selected by the multiplexer;
    (iv) means for initializing the data exchange unit so that it is synchronized with the other data exchange units;
    (v) receiver means, having a plurality of receiver inputs and a plurality of receiver outputs, for receiving the data selected for output by the multiplexer in each data exchange unit on a different receiver input and producing a corresponding output of the data thereby received; and
    (vi) voter means, connected to the receiver outputs, for selecting data from the receiver means for output from the data exchange unit according to predefined logic rules, so as to provide consistent data for all of the data exchange units, for said output, even when differences in the data input to the receiver means from each of the multiplexers are not the same;
  (b) first communication means for connecting the transmitter of each data exchange unit to a different one of the inputs of each multiplexer in the data exchange units;
  (c) second communication means for connecting the output of each multiplexer to a different receiver input of the receiver means of each data exchange unit; and (d) the second communication means including a plurality of consistency ports, each consistency port being associated with one of the data exchange units and having an input connected to receive the data selected for output from the multiplexer comprising said one data exchange unit, and a plurality of outputs, each connected to the receiver means in a different data exchange unit, the consistency ports each comprising a fault containment region that blocks propagation of faults within the data exchange system.

10. The dam exchange system of claim 9, wherein each data exchange unit further comprises error logging means for monitoring and detecting errors in the data input to the voter means, based upon unexpected differences in said data, the error logging means identifying the data and channel in which each such error occurred, the error logging means being connected to the local bus by at least one buffer in which said errors are temporarily stored.

11. The data exchange system of claim 9, wherein the initialization means comprise a plurality of serial receivers, each having an output and an input connected via the first communication means to one of the transmitters on a different one of the data exchange units; and a plurality of buffers that connect the outputs of the serial receivers to the local bus and temporarily store data output from one of the serial receivers.

12. The data exchange system of claim 11, wherein the transmitters on each data exchange unit repetitively transmit a channel initialization status vector that includes a timer status indicator that is received by the serial receivers in each of the data exchange units and is used in forming a node initialization status vector that is voted by the voter means until a consensus vote determines which of the channels are not faulty and can comprise a voting set, said voting set then synchronizing by voting on a sync interval transmitted by each of the channels comprising the voting set.

13. The data exchange system of claim 9, wherein each data exchange unit further comprises control means for controlling the multiplexer so as to determine which of its inputs is selected for propagation to its output, based upon the type of data that is input from the local bus to the transmitter, including nominal single source data and nominal identical data from different sources.

14. A method for transferring data from at least one source, so as to detect and compensate a fault in at least one channel of a fault tolerant system having redundant channels for communicating and processing data, the method comprising the steps of:
  (a) for each channel, distributing data produced by the at least one source over a local bus;
  (b) transmitting said data to the other channels over an inter-channel communications link;
  (c) selectively receiving the data distributed from each of the channels over the inter-channel communications link, in turn, for transmission to a consistency port associated with each channel that retransmits the data to all of the channels over separate communication lines; and
  (d) voting the data retransmitted from each of the consistency ports to select data that are output, the data thus selected compensating for at least one fault in the communication of data within the fault tolerant system.

15. The method of claim 14, further comprising the step of synchronizing the channels prior to transmitting said data over the inter-channel communications link.

16. The method of claim 14, further comprising the steps of determining whether the data comprise single source data or identical dam, and if the data comprise identical data, transmitting said data directly to the consistency ports of each of the other channels, instead of initially distributing the data between the channels over the inter-channel communications link.

17. The method of claim 14, further comprising the step of storing the data transmitted over the inter-channel communications link for a time longer than a maximum skew interval during which the data are transferred, to compensate for lack of synchronization between the channels.

18. The method of claim 14, further comprising the step of storing the data from the consistency ports before said data are voted sufficiently long to compensate for skew between the channels.

19. The method of claim 14, further comprising the steps of detecting errors in the data voted and logging those errors.

20. The method of claim 19, wherein three types of errors are detected, including:
   (a) orphan errors, wherein voting is attempted on one channel, but not on the others;
   (b) no-show errors, wherein at the time of voting, data have not been received from one channel; and
   (c) disagreement errors, wherein the data from the plurality of channels do not agree when voted.

* * * * *

UNITED STATES PATENT AND TRADEMARK OFFICE
CERTIFICATE OF CORRECTION

PATENT NO. : 5,349,654
DATED : September 20, 1994
INVENTOR(S) : D.G. Bond et al.

Page 1 of 2

It is certified that error appears in the above-indentified patent and that said Letters Patent is hereby corrected as shown below:

| COLUMN | LINE |  |
|---|---|---|
| 3 | 34 | "dam" should read --data-- |
| 4 | 64 | "16a16b, or 16c" should read -- 16a, 16b, or 16c-- |
| 6 | 65 | "dam" should read --data-- |
| 8 | 39 | "dam" should read --data-- |
| 10 | 53 | "dam" should read --data-- |
| 10 | 63 | "dam" should read --data-- |
| 11 | 68 | "requiting" should read --requiring-- |
| 12 | 20 | "32" should read --=-- |
| 17 | 56 | "dam" should read --data-- |
| 20 | 12 | "dam" should read --data-- |

UNITED STATES PATENT AND TRADEMARK OFFICE
CERTIFICATE OF CORRECTION

PATENT NO. : 5,349,654

DATED : September 20, 1994

INVENTOR(S) : D.G. Bond et al.

It is certified that error appears in the above-indentified patent and that said Letters Patent is hereby corrected as shown below:

| COLUMN | LINE | |
|--------|------|---|
| 21 | 6 | "dam" should read --data-- |

Signed and Sealed this

Seventeenth Day of January, 1995

Attest:

BRUCE LEHMAN

Attesting Officer      Commissioner of Patents and Trademarks